United States Patent
Xiong

(10) Patent No.: US 9,231,432 B2
(45) Date of Patent: Jan. 5, 2016

(54) ELECTRONIC DEVICE AND CHARGING CIRCUIT THEREOF

(71) Applicant: Zhongshan Innocloud Intellectual Property Services Co., Ltd., Zhongshan (CN)

(72) Inventor: Jin-Liang Xiong, Wuhan (CN)

(73) Assignee: Zhongshan Innocloud Intellectual Property Services Co.,Ltd., Zhongshan (CN)

( * ) Notice: Subject to any disclaimer, the term of this patent is extended or adjusted under 35 U.S.C. 154(b) by 64 days.

(21) Appl. No.: 14/229,977

(22) Filed: Mar. 30, 2014

(65) Prior Publication Data

US 2014/0292282 A1    Oct. 2, 2014

(30) Foreign Application Priority Data

Mar. 29, 2013  (CN) .......................... 2013 1 1054771

(51) Int. Cl.
  *H02J 7/00*    (2006.01)
  *H02J 7/02*    (2006.01)

(52) U.S. Cl.
  CPC ............... *H02J 7/027* (2013.01); *H02J 7/022* (2013.01); *H02J 7/0045* (2013.01)

(58) Field of Classification Search
  CPC ....................................................... Y02E 60/12
  USPC .......................................................... 320/137
  See application file for complete search history.

(56) References Cited

U.S. PATENT DOCUMENTS

| | | | | |
|---|---|---|---|---|
| 6,091,229 A * | 7/2000 | Oglesbee | ................ | H02J 7/022 320/137 |
| 6,100,667 A * | 8/2000 | Mercer | ................ | H02J 7/0052 320/107 |
| 2013/0134947 A1* | 5/2013 | Wang | ................ | G06F 1/266 320/137 |
| 2014/0145680 A1* | 5/2014 | Mullin | ................ | H02J 7/0091 320/134 |
| 2014/0292257 A1* | 10/2014 | Zhou | ................ | H02J 7/027 320/107 |
| 2015/0234363 A1* | 8/2015 | Yoon | ................ | G05B 9/02 320/137 |

* cited by examiner

*Primary Examiner* — Suresh Memula
(74) *Attorney, Agent, or Firm* — Novak Druce Connolly Bove + Quigg LLP

(57) ABSTRACT

A charging circuit is used to charge a rechargeable battery. The charging circuit includes a voltage conversion unit and a leakage prevention unit. The voltage conversion unit converts a voltage of a power supply into a charging voltage of the rechargeable battery, and outputs the charging voltage to the leakage prevention unit. When the leakage prevention unit receives the charging voltage, the leakage prevention unit charges the rechargeable battery with the charging voltage. When the leakage prevention unit does not receive the charging voltage, the leakage prevention unit prevents a leakage of the rechargeable battery.

18 Claims, 4 Drawing Sheets

ELECTRONIC DEVICE AND CHARGING CIRCUIT THEREOF

FIELD

The present disclosure relates to electronic devices, and particularly to an electronic device with a charging circuit.

BACKGROUND

Rechargeable batteries need a dedicated charger to be charged. However, if the dedicated charger is not on hand, there is no way to charge the rechargeable batteries.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references can mean "at least one."

Figure 1:
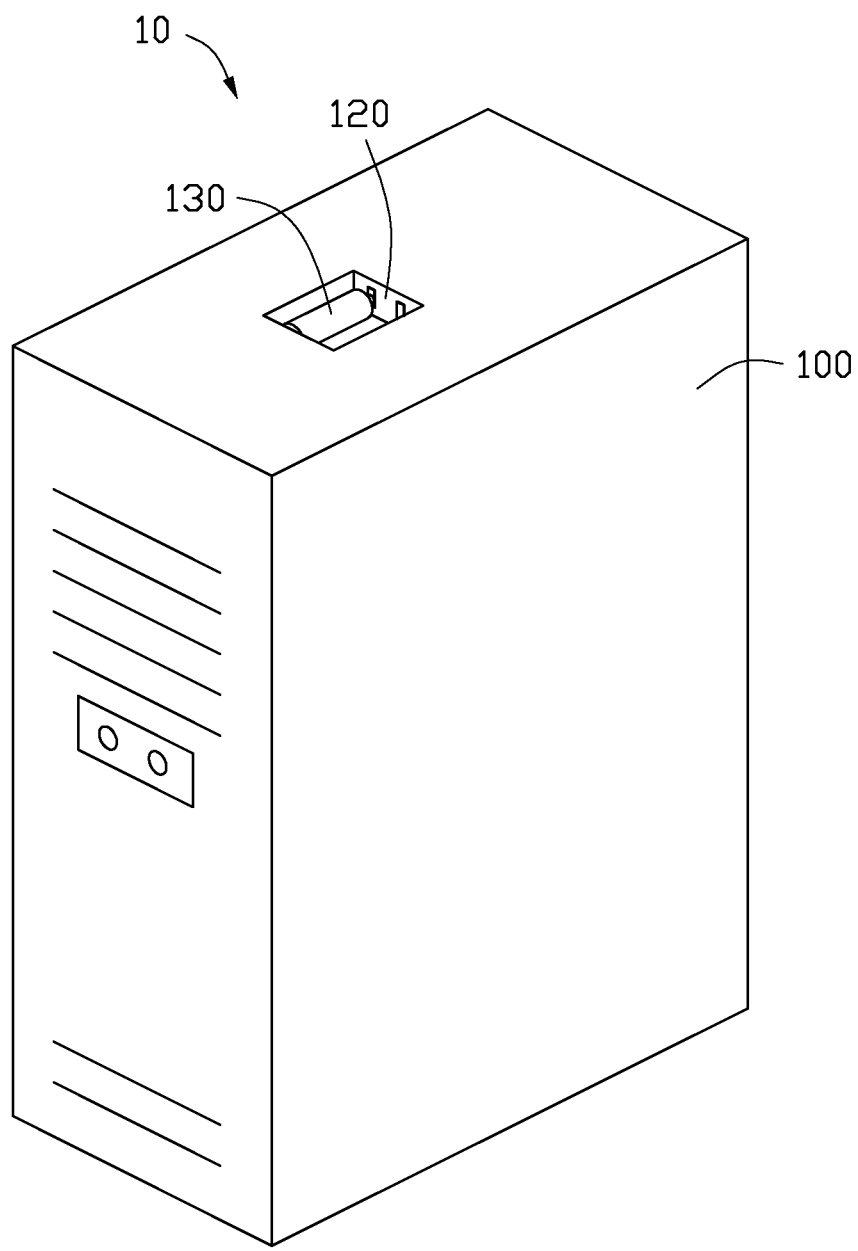
FIG. 1 is an isometric view of an embodiment of an electronic device comprising a charging circuit.
Figure 2:
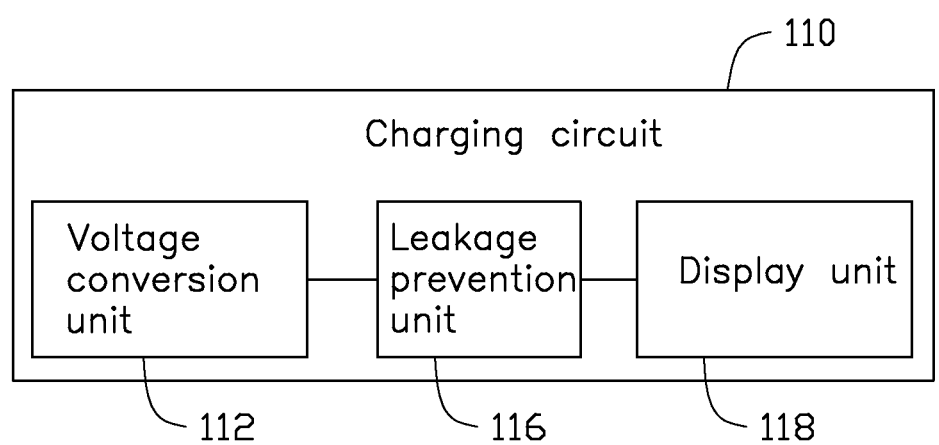
FIG. 2 is a block diagram of an embodiment of a charging circuit for the electronic device of FIG. 1, the charging circuit comprising a voltage conversion unit, a leakage prevention unit, and a display unit.

FIGS. 1 and 2 show an embodiment of an electronic device 10. The electronic device 10 comprises a shell 100 and a charging circuit 110 received in the shell 100. A receiving space 120 is defined in the shell 100 to receive a rechargeable battery 130. The rechargeable battery 130 is electrically connected to the charging circuit 110. In at least one embodiment, the electronic device 10 is a chassis of a desktop computer.

Figure 3:
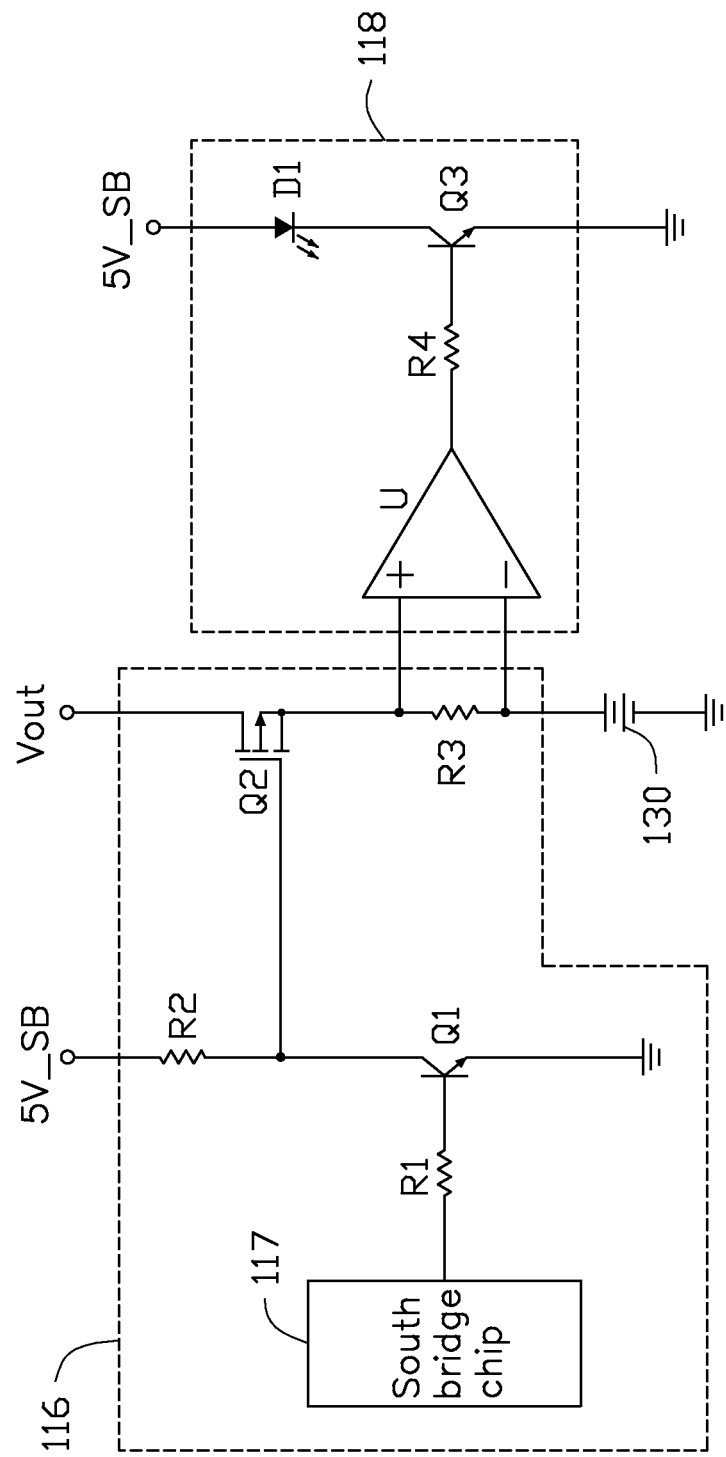
FIG. 3 is a circuit diagram of the leakage prevention unit and the display unit of FIG. 2.
Figure 4:
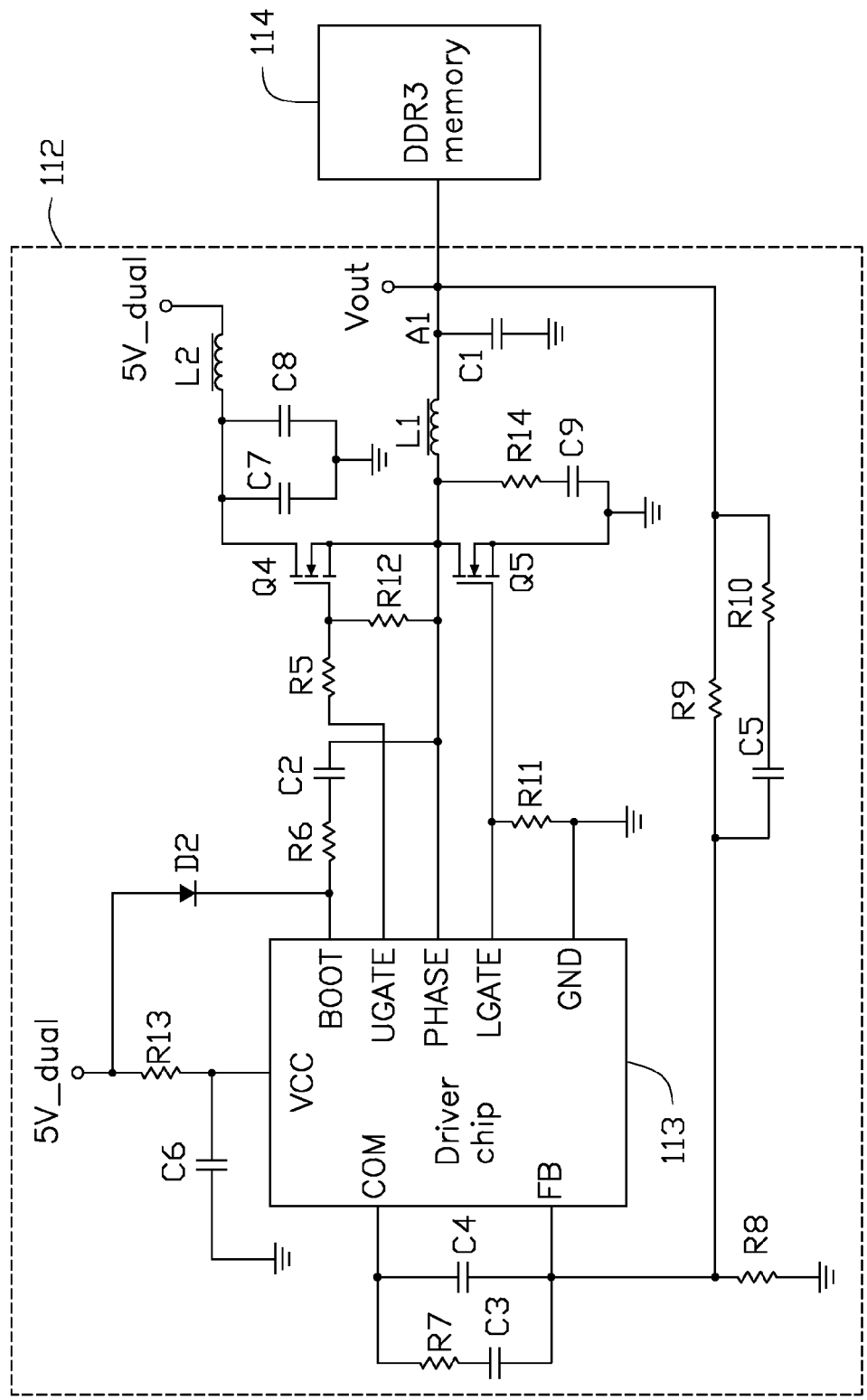
FIG. 4 is a circuit diagram of the voltage conversion unit of FIG. 2.

FIGS. 2 to 4 show an embodiment of the charging circuit 110. The charging circuit 110 comprises a voltage conversion unit 112, a leakage prevention unit 116, and a display unit 118. The leakage prevention unit 116 is electrically connected to the voltage conversion unit 112 and the display unit 118, and is electrically connected to the rechargeable battery 130 through the receiving space 120. The voltage conversion unit 112 is used for converting a voltage of a dual 5V power supply 5V_dual of a motherboard into a charging voltage Vout of the rechargeable battery 130, and outputting the charging voltage Vout to the leakage prevention unit 116. The leakage prevention unit 116 is used for charging the rechargeable battery 130 with the charging voltage Vout, when the leakage prevention unit 116 receives the charging voltage Vout. The leakage prevention unit 116 is further used for preventing a leakage of the rechargeable battery 130, when the leakage prevention unit 116 does not receive the charging voltage Vout. The display unit 118 can be configured to display an indication as to whether or not the rechargeable battery 130 is charged.

The leakage prevention unit 116 comprises a south bridge chip 117, a first electronic switch Q1, a second electronic switch Q2, and first to third resistors R1-R3. Each of the first electronic switch Q1 and the second electronic switch Q2 comprises a first terminal, a second terminal, and a third terminal. The first terminal of the first electronic switch Q1 is electrically connected to the south bridge chip 117 through the first resistor R1. The second terminal of the first electronic switch Q2 is electrically connected to a 5V standby power supply 5V_SB of the motherboard through the second resistor R2. The third terminal of the first electronic switch Q1 is grounded. The first terminal of the second electronic switch Q2 is electrically connected to the second terminal of the first electronic switch Q1. The second terminal of the second electronic switch Q2 is electrically connected to the voltage conversion unit 112, to receive the charging voltage Vout. The third terminal of the second electronic switch Q2 is electrically connected to a positive terminal of the rechargeable battery 130 through the third resistor R3. A negative terminal of the rechargeable battery 130 is grounded.

The display unit 118 comprises a comparator U, a third electronic switch Q3, a light-emitting diode (LED) D1, and a fourth resistor R4. The comparator U comprises a non-inverting terminal, an inverting terminal, and an output terminal. The third electronic switch Q3 comprising a first terminal, a second terminal, and a third terminal. The non-inverting terminal of the comparator U is electrically connected to the third terminal of the second electronic switch Q2. The inverting terminal of the comparator U is electrically connected to the positive terminal of the rechargeable battery 130. The first terminal of the third electronic switch Q3 is electrically connected to the output terminal of the comparator U through the fourth resistor R4. The second terminal of the third electronic switch Q3 is electrically connected to a cathode of the LED D1. The third terminal of the third electronic switch Q3 is grounded. An anode of the LED D1 is electrically connected to the 5V standby power supply 5V_SB.

The voltage conversion unit 112 comprises a driver chip 113, a fourth electronic switch Q4, a fifth electronic switch Q5, a first inductor L1, a second inductor L2, a diode D2, first through ninth capacitors C1-C9, and fifth through fourteenth resistors R5-R14. The driver chip 113 comprises a first control pin UGATE, a second control pin LGATE, a phase pin PHASE, a bootstrap pin BOOT, an compensation pin EN, a feedback pin FB, a power pin VCC, and a ground pin GND. Each of the fourth electronic switch Q4 and the fifth electronic switch Q5 comprises a first terminal, a second terminal, and a third terminal. The first terminal of the fourth electronic switch Q4 is electrically connected to the first control pin UGATE of the driver chip 113 through the fifth resistor R5. The second terminal of the fourth electronic switch Q4 is electrically connected to the dual 5V power supply 5V_dual through the second inductor L2, is grounded through the seventh capacitor R7, and is grounded through the capacitor C8. The third terminal of the fourth electronic switch Q4 is grounded through the first inductor L1 and the first capacitor C1 in that order. The first terminal of the fifth electronic switch Q5 is electrically connected to the second control pin LGATE of the driver chip 113. The second terminal of the fifth electronic switch Q5 is electrically connected to the third terminal of the fourth electronic switch Q4, and is electrically connected to the phase pin PHASE of the driver chip 113. The third terminal of the fifth electronic switch Q5 is grounded. A node A1 between the first inductor L1 and the first capacitor C1 functions as an output terminal of the voltage conversion unit 112, and is electrically connected to the leakage prevention unit 116 to output the charging voltage Vout to the leakage prevention unit 116. An anode of the diode D2 is electrically connected to the dual 5V power supply 5V_dual. A cathode of the diode D2 is electrically connected to the bootstrap pin BOOT of the driver chip 113. The bootstrap pin BOOT of the driver chip 113 is electrically connected to the phase pin PHASE of the driver chip 113 through the sixth resistor R6 and the second capacitor C2 in that order. The compensation pin EN of the driver chip 113 is electrically connected to the feedback pin FB of the driver chip 113 through the seventh resistor R7 and the third capacitor C3 in that order, and is electrically connected to the feedback pin FB of the driver chip 113 through the fourth capacitor C4. The feedback pin FB of the driver chip 113 is grounded through the eighth resistor R8, is electrically connected to the output terminal of the voltage conversion unit 112 through the ninth resistor R9, and is further electrically connected to the output terminal of the voltage conversion unit 112 through the fifth capacitor C5 and the tenth resistor R10 in that order. The second control pin LGATE of the driver chip 113 is grounded through the eleventh resistor R11. The phase pin PHASE of the driver chip 113 is electrically connected to the first terminal of the fourth electronic switch Q4 through the twelfth resistor R12. The power pin VCC of the driver chip 113 is electrically connected to the dual 5V power supply 5V_dual through the thirteenth resistor R13, and is grounded through the sixth capacitor C6. The ground pin GND of the driver chip 113 is grounded. The second terminal of the fifth electronic switch Q5 is grounded through the fourteenth resistor R14 and the ninth capacitor C9 in that order.

When the rechargeable battery 130 needs to be charged, the rechargeable battery 130 is received in the receiving space 120 and is electrically connected to the charging circuit 110.

In use, the first control pin UGATE and the second control pin LGATE of the driver chip 113 alternately output high level signals to alternately turn on the fourth electronic switch Q4 and the fifth electronic switch Q5. When the first control pin UGATE outputs a high level signal, such as logic 1, and the second control pin LGATE outputs a low level signal, such as logic 0, the fourth electronic switch Q4 is turned on, and the fifth electronic switch Q5 is turned off. The dual 5V power supply 5V_dual supplies power to charge the first inductor L1 and the first capacitor C1 through the fourth electronic switch Q4. When the first control pin UGATE outputs a low level signal and the second control pin LGATE outputs a high level signal, the fourth electronic switch Q4 is turned off, and the fifth electronic switch Q5 is turned on. The first inductor L1 and the first capacitor C1 are discharged through the fourth electronic switch Q4. The output terminal of the voltage conversion unit 112 can then output the charging voltage Vout.

When the voltage conversion unit 112 outputs the charging voltage Vout and the south bridge chip 117 outputs a first control signal to turn on the first electronic switch Q1, the second electronic switch Q2 is turned on, and the rechargeable battery 130 is charged by the charging voltage Vout through the second electronic switch Q2 and the third resistor R3 in that order. There is a voltage difference across the third resistor R3. A voltage at the non-inverting terminal of the comparator U is greater than a voltage at the inverting terminal of the comparator U, and the output terminal of the comparator U outputs a high level signal. The third electronic switch Q3 is turned on, and the LED D1 is lit up to indicate the rechargeable battery 130 is being charged.

When the voltage conversion unit 112 does not output the charging voltage Vout and the south bridge chip 117 outputs a second control signal to turn off the first electronic switch Q1, the second electronic switch Q2 is turned off to prevent a leakage of the rechargeable battery 130. There is no voltage difference across the third resistor R3. The voltage at the non-inverting terminal of the comparator U is equal to the voltage at the inverting terminal of the comparator U, and the output terminal of the comparator U outputs a low level signal. The third electronic switch Q3 is turned off, and the LED D1 is not lit up to indicate the rechargeable battery 130 is not charged.

In at least one embodiment, each of the first electronic switch Q1 and the third electronic switch Q3 is an npn-type bipolar junction transistor (BJT), and the first terminal, the second terminal, and the third terminal of each of the first electronic switch Q1 and the third electronic switch Q3 respectively corresponding to a base, a collector, and an emitter of the npn-type BJT. The second electronic switch Q2 is a p-channel metal-oxide semiconductor field-effect transistor (PMOSFET), and the first terminal, the second terminal, and the third terminal of the second electronic switch Q2 are respectively corresponding to a gate, a drain, and a source of the PMOSFET. Each of the fourth electronic switch Q4 and the fifth electronic switch Q5 is an n-channel metal-oxide semiconductor field-effect transistor (NMOSFET), and the first terminal, the second terminal, and the third terminal of each of the fourth electronic switch Q4 and the fifth electronic switch Q5 are respectively corresponding to a gate, a drain, and a source of the NMOSFET. The first control signal is a high level signal, such as logic 1. The second control signal is a low level signal, such as logic 1. In other embodiments, each of the first electronic switch Q1 and the third electronic switch Q3 may be an NMOSFET, or other switch having similar functions. The second electronic switch Q2 may be a pnp-type BJT, or other switch having similar functions. Each of the fourth electronic switch Q4 and the fifth electronic switch Q5 may be an npn-type BJT, or other switch having similar functions. A voltage level of each of the first control signal and the second control signal can be adjusted according to actual need.

In at least one embodiment, the charging voltage Vout is further used to supply power to an electronic element, such as a double data rate 3 (DDR3) memory 114 of the electronic device 10. When the electronic device 10 is in power states S0-S3 defined by advanced configuration and power interface (ACPI), the south bridge chip 117 outputs a high level signal to the first terminal of the first electronic switch Q1. When the electronic device 10 is in power states S4-S5 defined by ACPI, the south bridge chip 117 outputs a low level signal to the first terminal of the first electronic switch Q1.

In at least one embodiment, the diode D2, the sixth resistor R6, and the second capacitor C2 form a bootstrap circuit for raising a voltage of the bootstrap pin BOOT of the driver chip 113. The third capacitor C3, the fourth capacitor C4, and the seventh resistor R7 form a compensation circuit for improving accuracy of voltage and current output from the voltage conversion unit 112. The second inductor L2, the seventh capacitor C7, and the eighth capacitor C8 form a filter circuit, for filtering voltage spikes generated by the fourth electronic switch Q4, when the fourth electronic switch Q4 switches between an on-state and an off-state. The fourteenth resistor R14 and the ninth capacitor C9 form a buffer circuit for buffering a voltage spike generated by the fifth electronic switch Q5, when the fifth electronic switch Q5 switches between an on-state and an off-state. The thirteenth resistor R13 and the sixth capacitor C6 form a low pass filter for filtering noise in the dual 5V power supply 5V_dual.

As detailed above, the voltage conversion unit 112 converts the dual 5V power supply 5V_dual into the charging voltage Vout, and the leakage prevention unit 116 charges the rechargeable battery 130 with the charging voltage Vout, and further, the display unit 118 displays whether the rechargeable battery 130 is being charged or not, the rechargeable battery 130 can be charged by the electronic device 10, and a dedicated charger is not needed.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A charging circuit for charging a rechargeable battery, the charging circuit comprising:
   a voltage conversion unit to convert a voltage of a first power supply into a charging voltage of the rechargeable battery, and to output the charging voltage; and
   a leakage prevention unit comprising:
      a first resistor, a second resistor, and a third resistor;
      a south bridge chip;
      a first electronic switch comprising a first terminal electrically connected to the south bridge chip through the first resistor, a second terminal electrically connected to a second power supply through the second resistor, and a third terminal grounded; and
      a second electronic switch comprising a first terminal electrically connected to the second terminal of the first electronic switch, a second terminal electrically connected to the voltage conversion unit to receive the charging voltage, and a third terminal electrically connected to a positive terminal of the rechargeable battery, wherein a negative terminal of the rechargeable battery is grounded;
   wherein in response to the voltage conversion unit outputting the charging voltage and the south bridge chip outputting a first control signal to turn on the first electronic switch, the second electronic switch is turned on, the rechargeable battery is charged by the charging voltage through the second electronic switch and the third resistor, in that order; and
   wherein in response to the voltage conversion unit not outputting the charging voltage and the south bridge chip outputting a second control signal to turn off the first electronic switch, the second electronic switch switches off.

2. The charging circuit of claim 1, further comprising a display unit comprising:
   a fourth resistor;
   a light-emitting diode (LED) comprising an anode electrically connected to the second power supply, and a cathode;
   a comparator comprising a non-inverting terminal electrically connected to the third terminal of the second electronic switch, an inverting terminal electrically connected to the positive terminal of the rechargeable battery, and an output terminal; and
   a third electronic switch comprising a first terminal electrically connected to the output terminal of the comparator through the fourth resistor, a second terminal electrically connected to the cathode of the LED, and a third terminal grounded;
   wherein in response to the second electronic switch being turned on and the rechargeable battery being charged by the charging voltage through the second electronic switch and the third resistor in that order, a voltage at the non-inverting terminal of the comparator is greater than a voltage at the inverting terminal of the comparator, the output terminal of the comparator outputs a high level signal, the third electronic switch is turned on, and the LED is lit up to indicate the rechargeable battery is being charged; and
   wherein in response to the second electronic switch being turned on or the rechargeable battery being fully charged, the voltage at the non-inverting terminal of the comparator is equal to the voltage at the inverting terminal of the comparator, the output terminal of the comparator outputs a low level signal, the third electronic switch is turned off, and the LED is deactivated to indicate the rechargeable battery is not charged.

3. The charging circuit of claim 2, wherein each of the first electronic switch and the third electronic switch is an npn-type bipolar junction transistor (BJT), and the first terminal, the second terminal, and the third terminal of each of the first electronic switch and the third electronic switch respectively corresponding to a base, a collector, and an emitter of the npn-type BJT, the second electronic switch is an p-channel metal-oxide semiconductor field-effect transistor (PMOSFET), and the first terminal, the second terminal, and the third terminal of the second electronic switch are respectively corresponding to a gate, a drain, and a source of the PMOSFET.

4. The charging circuit of claim 2, wherein the second power supply is a 5V standby power supply.

5. The charging circuit of claim 1, wherein the voltage conversion unit comprises:
   a first inductor;
   a first capacitor;
   a fourth resistor;
   a driver chip comprising a first control pin, a second control pin, and a phase pin;
   a third electronic switch comprising a first terminal electrically connected to the first control pin of the driver chip through the fourth resistor, a second terminal electrically connected to the first power supply, and a third terminal grounded through the first inductor and the first capacitor in that order; and
   a fourth electronic switch comprising a first terminal electrically connected to the second control pin of the driver chip, a second terminal electrically connected to the third terminal of the third electronic switch and electrically connected to the phase pin of the driver chip, and a third terminal grounded;
   wherein a node between the first inductor and the first capacitor functions as the output terminal of the voltage conversion unit, and is electrically connected to the charging and display unit;
   wherein the first control pin and the second control pin of the driver chip alternately output high level signals to alternately turn on the fourth electronic switch or the fifth electronic switch; and
   wherein in response to the first control pin of the driver chip outputting a high level signal, and the second control pin of the driver chip outputting a low level signal, the third electronic switch is turned on, the fourth electronic switch is turned off, the first inductor and the first capacitor are charged by the first power supply through the third electronic switch; and in response to the first control pin of the driver chip outputting a low level signal, and the second control pin of the driver chip outputting a high level signal, the third electronic switch is turned off, the fourth electronic switch is turned on, the first inductor and the first capacitor are discharged through the fourth electronic switch; and thus the output terminal of the voltage conversion unit outputs the charging voltage.

6. The charging circuit of claim 5, wherein the voltage conversion unit further a bootstrap circuit, a compensation circuit, a low pass filter, a filter circuit, a buffer circuit, a second capacitor, a fifth resistor, a sixth resistor, a seventh resistor, an eighth resistor, and a ninth resistor; and
the driver chip further comprises:
a bootstrap pin electrically connected to the phase pin of the driver chip through the bootstrap circuit;
a feedback pin grounded through the fifth resistor, electrically connected to the output terminal of the voltage conversion unit through the sixth resistor, and electrically connected to the output terminal of the voltage conversion unit through the second capacitor and the seventh resistor in that order;
an enable pin electrically connected to the feedback pin of the driver chip through the compensation circuit;
a power pin electrically connected to the first power supply through the low pass filter; and
a grounded ground pin;
wherein the second control pin of the driver chip is grounded through the eighth resistor, the phase pin of the driver chip is electrically connected to the first terminal of the third electronic switch through the ninth resistor, the second terminal of the third electronic switch is electrically connected to the first power supply through the filter circuit, and the second terminal of the fourth electronic switch grounded through the buffer circuit.

7. The charging circuit of claim 6, wherein the bootstrap circuit comprises a diode comprising an anode electrically connected to the first power supply and a cathode, a tenth resistor, and a third capacitor; the compensation circuit comprises a fourth capacitor, a fifth capacitor, and an eleventh resistor; the low pass filter comprises a twelfth resistor and a sixth capacitor; the filter circuit comprises a second inductor, a seventh capacitor, and an eighth capacitor; the buffer circuit comprises a thirteenth resistor and a ninth capacitor; the bootstrap pin of the driver chip is electrically connected to the cathode of the diode, and electrically connected to the phase pin of the driver chip through the tenth resistor and the third capacitor in that order; the enable pin of the driver chip is electrically connected to the feedback pin of the driver chip through the fourth capacitor, and electrically connected to the feedback pin of the driver chip through the eleventh resistor and the fifth capacitor in that order; the power pin of the driver chip is electrically connected to the first power supply through the twelfth resistor and grounded through the sixth capacitor; the second terminal of the third electronic switch is electrically connected to the first power supply through the second inductor, grounded through the seventh capacitor, and grounded through the eighth capacitor; the second terminal of the fourth electronic switch is grounded through the thirteenth resistor and the ninth capacitor in that order.

8. The charging circuit of claim 7, wherein each of the third electronic switch and the fourth electronic switch is an n-channel metal-oxide semiconductor field-effect transistor (NMOSFET), and the first terminal, the second terminal, and the third terminal of each of the third electronic switch and the fourth electronic switch are respectively corresponding to a gate, a drain, and a source of the NMOSFET.

9. The charging circuit of claim 1, wherein the first power supply is a dual 5V power supply.

10. An electronic device comprising:
a shell comprising a receiving space to receive a rechargeable battery; and
a charging circuit received in the shell and electrically connected to the rechargeable battery to charge the rechargeable battery, the charging circuit comprising:
a voltage conversion unit to convert a voltage of a first power supply into a charging voltage of the rechargeable battery, and to output the charging voltage; and
a leakage prevention unit comprising:
a first resistor, a second resistor, and a third resistor;
a south bridge chip;
a first electronic switch comprising a first terminal electrically connected to the south bridge chip through the first resistor, a second terminal electrically connected to a second power supply through the second resistor, and a third terminal grounded; and
a second electronic switch comprising a first terminal electrically connected to the second terminal of the first electronic switch, a second terminal electrically connected to the voltage conversion unit to receive the charging voltage, and a third terminal electrically connected to a positive terminal of the rechargeable battery, wherein a negative terminal of the rechargeable battery is grounded;
wherein in response to the voltage conversion unit outputting the charging voltage and the south bridge chip outputting a first control signal to turn on the first electronic switch, the second electronic switch is turned on, the rechargeable battery is charged by the charging voltage through the second electronic switch and the third resistor in that order; and
wherein in response to the voltage conversion unit not outputting the charging voltage and the south bridge chip outputting a second control signal to turn off the first electronic switch, the second electronic switch is turned off to prevent a leakage of the rechargeable battery.

11. The electronic device of claim 10, wherein the charging circuit further comprises a display unit comprising:
a fourth resistor;
a light-emitting diode (LED) comprising an anode electrically connected to the second power supply, and a cathode;
a comparator comprising a non-inverting terminal electrically connected to the third terminal of the second electronic switch, an inverting terminal electrically connected to the positive terminal of the rechargeable battery, and an output terminal; and
a third electronic switch comprising a first terminal electrically connected to the output terminal of the comparator through the fourth resistor, a second terminal electrically connected to the cathode of the LED, and a third terminal grounded;
wherein in response to the second electronic switch being turned on and the rechargeable battery being charged by the charging voltage through the second electronic switch and the third resistor in that order, a voltage at the non-inverting terminal of the comparator is greater than a voltage at the inverting terminal of the comparator, the output terminal of the comparator outputs a high level signal, the third electronic switch is turned on, and the LED is lit up to indicate the rechargeable battery is being charged; and
wherein in response to the second electronic switch being turned on or the rechargeable battery being fully charged, the voltage at the non-inverting terminal of the comparator is equal to the voltage at the inverting terminal of the comparator, the output terminal of the comparator outputs a low level signal, the third electronic switch is turned off, and the LED is not lit up to indicate the rechargeable battery is not charged.

12. The electronic device of claim 11, wherein each of the first electronic switch and the third electronic switch is an npn-type bipolar junction transistor (BJT), and the first terminal, the second terminal, and the third terminal of each of the first electronic switch and the third electronic switch respectively corresponding to a base, a collector, and an emitter of the npn-type BJT, the second electronic switch is an p-channel metal-oxide semiconductor field-effect transistor (PMOSFET), and the first terminal, the second terminal, and the third terminal of the second electronic switch are respectively corresponding to a gate, a drain, and a source of the PMOSFET.

13. The electronic device of claim 11, wherein the second power supply is a 5V standby power supply.

14. The electronic device of claim 10, wherein the voltage conversion unit comprises:
 a first inductor;
 a first capacitor;
 a fourth resistor;
 a driver chip comprising a first control pin, a second control pin, and a phase pin;
 a third electronic switch comprising a first terminal electrically connected to the first control pin of the driver chip through the fourth resistor, a second terminal electrically connected to the first power supply, and a third terminal grounded through the first inductor and the first capacitor in that order; and
 a fourth electronic switch comprising a first terminal electrically connected to the second control pin of the driver chip, a second terminal electrically connected to the third terminal of the third electronic switch and electrically connected to the phase pin of the driver chip, and a third terminal grounded;
 wherein a node between the first inductor and the first capacitor functions as the output terminal of the voltage conversion unit, and is electrically connected to the charging and display unit;
 wherein the first control pin and the second control pin of the driver chip alternately output high level signals to alternately turn on the fourth electronic switch or the fifth electronic switch; and
 wherein in response to the first control pin of the driver chip outputting a high level signal, and the second control pin of the driver chip outputting a low level signal, the third electronic switch is turned on, the fourth electronic switch is turned off, the first inductor and the first capacitor are charged by the first power supply through the third electronic switch; and in response to the first control pin of the driver chip outputting a low level signal, and the second control pin of the driver chip outputting a high level signal, the third electronic switch is turned off, the fourth electronic switch is turned on, the first inductor and the first capacitor are discharged through the fourth electronic switch; and thus the output terminal of the voltage conversion unit outputs the charging voltage.

15. The electronic device of claim 14, wherein the voltage conversion unit further a bootstrap circuit, a compensation circuit, a low pass filter, a filter circuit, a buffer circuit, a second capacitor, a fifth resistor, a sixth resistor, a seventh resistor, an eighth resistor, and a ninth resistor; and
 the driver chip further comprises:
  a bootstrap pin electrically connected to the phase pin of the driver chip through the bootstrap circuit;
  a feedback pin grounded through the fifth resistor, electrically connected to the output terminal of the voltage conversion unit through the sixth resistor, and electrically connected to the output terminal of the voltage conversion unit through the second capacitor and the seventh resistor in that order;
  an enable pin electrically connected to the feedback pin of the driver chip through the compensation circuit;
  a power pin electrically connected to the first power supply through the low pass filter; and
  a grounded ground pin;
 wherein the second control pin of the driver chip is grounded through the eighth resistor, the phase pin of the driver chip is electrically connected to the first terminal of the third electronic switch through the ninth resistor, the second terminal of the third electronic switch is electrically connected to the first power supply through the filter circuit, and the second terminal of the fourth electronic switch grounded through the buffer circuit.

16. The electronic device of claim 15, wherein the bootstrap circuit comprises a diode comprising an anode electrically connected to the first power supply and a cathode, a tenth resistor, and a third capacitor; the compensation circuit comprises a fourth capacitor, a fifth capacitor, and an eleventh resistor; the low pass filter comprises a twelfth resistor and a sixth capacitor; the filter circuit comprises a second inductor, a seventh capacitor, and an eighth capacitor; the buffer circuit comprises a thirteenth resistor and a ninth capacitor; the bootstrap pin of the driver chip is electrically connected to the cathode of the diode, and electrically connected to the phase pin of the driver chip through the tenth resistor and the third capacitor in that order; the enable pin of the driver chip is electrically connected to the feedback pin of the driver chip through the fourth capacitor, and electrically connected to the feedback pin of the driver chip through the eleventh resistor and the fifth capacitor in that order; the power pin of the driver chip is electrically connected to the first power supply through the twelfth resistor and grounded through the sixth capacitor; the second terminal of the third electronic switch is electrically connected to the first power supply through the second inductor, grounded through the seventh capacitor, and grounded through the eighth capacitor; the second terminal of the fourth electronic switch is grounded through the thirteenth resistor and the ninth capacitor in that order.

17. The electronic device of claim 16, wherein each of the third electronic switch and the fourth electronic switch is an n-channel metal-oxide semiconductor field-effect transistor (NMOSFET), and the first terminal, the second terminal, and the third terminal of each of the third electronic switch and the fourth electronic switch are respectively corresponding to a gate, a drain, and a source of the NMOSFET.

18. The electronic device of claim 10, wherein the first power supply is a dual 5V power supply.

* * * * *